US006931568B2

(12) United States Patent
Abbondanzio et al.

(10) Patent No.: US 6,931,568 B2
(45) Date of Patent: Aug. 16, 2005

(54) FAIL-OVER CONTROL IN A COMPUTER SYSTEM HAVING REDUNDANT SERVICE PROCESSORS

(75) Inventors: Antonio Abbondanzio, Raleigh, NC (US); Gregory William Dake, Durham, NC (US); Dhruv Manmohandas Desai, Cary, NC (US); Benjamin Russell Grimes, Zebulon, NC (US); William Joseph Piazza, Holly Springs, NC (US); Gregory Brian Pruett, Raleigh, CA (US); David B. Rhoades, Apex, CA (US)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 10/113,167

(22) Filed: Mar. 29, 2002

(65) Prior Publication Data

US 2003/0188222 A1 Oct. 2, 2003

(51) Int. Cl.[7] .............................................. G06F 11/00
(52) U.S. Cl. ........................................................ 714/11
(58) Field of Search ..................................... 714/11, 13

(56) References Cited

U.S. PATENT DOCUMENTS

| | | | | |
|---|---|---|---|---|
| 3,786,433 A | * | 1/1974 | Notley et al. .................. 714/10 |
| 4,153,198 A | * | 5/1979 | Eki et al. ........................ 714/11 |
| 4,350,225 A | * | 9/1982 | Sakata et al. ................ 187/248 |
| 4,351,023 A | * | 9/1982 | Richer .......................... 700/82 |

(Continued)

FOREIGN PATENT DOCUMENTS

| | | |
|---|---|---|
| JP | 58225401 | 12/1983 |
| JP | 7160522 | 6/1995 |

OTHER PUBLICATIONS

Selection Mechanism for Active vs. Backup Processor; IBM Technical Disclosure Bulletin, 12–95, pp. 75–78, vol. 38, No. 12.

Primary Examiner—Bryce P. Bonzo
(74) Attorney, Agent, or Firm—Joseph P. Lally; Martin J. McKinley

(57) ABSTRACT

A system and method for determining an active service processor from two or more redundant service processors in the system. The system typically includes two management modules and at least one managed subsystem such as a server blade. Each management module includes a service processor and control logic. The control logic is configured to receive various status signals from the service processor and to generate a control signal based thereon. The control signal is provided, via an interconnect plane, to determination logic on each managed subsystem. The determination logic receives a control signal from each management module and generates a switch signal based on the state of the control signals. The switch signal controls switching logic configured to receive bus signals from the service processors on each management module. Based on the control signal, one of the service processor bus signals is provided to managed instrumentation on the managed subsystem. The management module control logic is generally configured to maintain the control signal in its current state if the active processor is determined to be functional. The control logic is further configured to alter the control signal state if the active service processor is determined to be non-functional. A transition in the control signal typically generates a fail-over event that causes the switching logic on the managed subsystems to switch from the previously active service processor to the previously inactive or standby service processor as the source of service processor signals.

23 Claims, 6 Drawing Sheets

U.S. PATENT DOCUMENTS

| | | | |
|---|---|---|---|
| 4,562,575 A | | 12/1985 | Townsend |
| 5,185,693 A | | 2/1993 | Loftis et al. |
| 5,251,299 A | | 10/1993 | Masuda et al. |
| 5,434,998 A | | 7/1995 | Akai et al. |
| 5,696,895 A | | 12/1997 | Hemphill et al. |
| 5,781,715 A | | 7/1998 | Sheu |
| 5,784,551 A | * | 7/1998 | De Leva et al. ............... 714/13 |
| 5,898,829 A | * | 4/1999 | Morikawa .................... 714/47 |
| 6,002,970 A | * | 12/1999 | Abdelnour et al. ........... 700/82 |
| 6,065,135 A | * | 5/2000 | Marshall et al. ............... 714/11 |
| 6,138,247 A | | 10/2000 | McKay et al. |
| 6,240,526 B1 | | 5/2001 | Petivan et al. |
| 6,425,092 B1 | * | 7/2002 | Evans et al. ................... 714/13 |
| 6,470,462 B1 | * | 10/2002 | Karlsson et al. ............... 714/11 |
| 6,550,018 B1 | * | 4/2003 | Abonamah et al. ............ 714/6 |
| 6,785,840 B1 | * | 8/2004 | Smith et al. ................... 714/11 |
| 2003/0159084 A1 | * | 8/2003 | Murphy et al. ............... 714/13 |

* cited by examiner

FAIL-OVER CONTROL IN A COMPUTER SYSTEM HAVING REDUNDANT SERVICE PROCESSORS

BACKGROUND

1. Field of the Present Invention

The present invention generally relates to the field of data processing systems and more particularly to a server system employing redundant service processors and to a method for managing the service processors when one fails.

2. History of Related Art

The concept of a service processor is well know in the field of data processing systems and particularly server class systems. Service processors are provided to manage certain aspects of a server and can be defined loosely as an auxiliary processor that monitors the environment and health of one or more main processors and their associated subsystems. In the event of an actual or predicted problem with a main processor, subsystem, or the environment, the service processor is capable of taking action to alert a system administrator and/or to correct the problem on its own. Service processors have been used on large systems such as IBM mainframes for decades and are now well established as a management tool for industry standard class servers including servers based on x86 processors such as the Pentium® family of processors from Intel.

Redundant service processors may be provided in high-availability systems so that a failure of one service processor does not result in the loss of the monitoring, alerting, and initialization capabilities that are imperative in such systems. Implementing redundant service processors is complicated for a number of reasons. A method by which the service processors agree which one is in control must be defined and subscribed to by both service processors. All subsystems, including the service processors themselves, must understand which service processor is in control at any given point in time. In some instances, hardware must be provided to switch busses from one service processor to the other and this hardware must switch the busses synchronously with fail-over of control from one service processor to the other. For purpose of this disclosure "fail-over" refers to a transfer of control from one service processor to another.

There are today a number of methods used in the industry to provide fail-over of redundant subsystems and to coordinate the actions of redundant controllers. Network adapter cards, for example, are sometimes installed in server systems as a redundant pair and a device driver is given the responsibility of transferring traffic from one to the other in the event of a failure of the active card. Those skilled in the art may also be familiar with "voting" systems in which an odd number of redundant controllers make a decision independently but simultaneously and the action taken depends upon what the majority of the systems agree is the proper course of action. Such systems, unfortunately, are typically complex, as evidenced by the delay in the first space shuttle launch caused by a failure of multiple on-board computers to synchronize their communications with each other in such a redundant-controller environment.

It would be desirable to implement a method and system that enables the use of redundant service processors and implements all related control issues. It would be further desirable if the implemented solution did not substantially increase the cost or complexity of the system.

SUMMARY OF THE INVENTION

The problems identified above are in large part addressed by a system and method for determining an active service processor from two or more redundant service processors in the system. The system includes at least one managed subsystem represented by, for example, a processor planar (blade), two (or possibly more) management modules, and an interconnection plane. The processor blade (server blade) includes one or more general purpose microprocessors, memory, and I/O devices according to well known microprocessor-based design principles. Each management module includes a service processor and control logic connected to the service processor. The control logic is configured to receive various status signals and to generate a control signal based thereon. The control signal is provided, via the interconnect plane, to determination logic on each managed subsystem. The determination logic receives a control signal from each management module and generates a switch signal based on the state of the control signals. The switch signal controls switching logic configured to receive bus signals from the service processors on each management module. Based on the control signal, one of the service processor bus signals is provided to managed instrumentation on the managed subsystem. The management module control logic is generally configured to maintain the control signal in its current state if the active processor is determined to be functional. The control logic is further configured to alter the control signal state if the active service processor is determined to be non-functional. A transition in the control signal typically generates a fail-over event that causes the switching logic on the managed subsystems to switch from the previously active service processor to the previously inactive or standby service processor as the source of service processor signals. The management module may further include a watchdog timer that is used to reset the local service processor if the processor "hangs."

BRIEF DESCRIPTION OF THE DRAWINGS

Other objects and advantages of the invention will become apparent upon reading the following detailed description and upon reference to the accompanying drawings in which.

Figure 1:
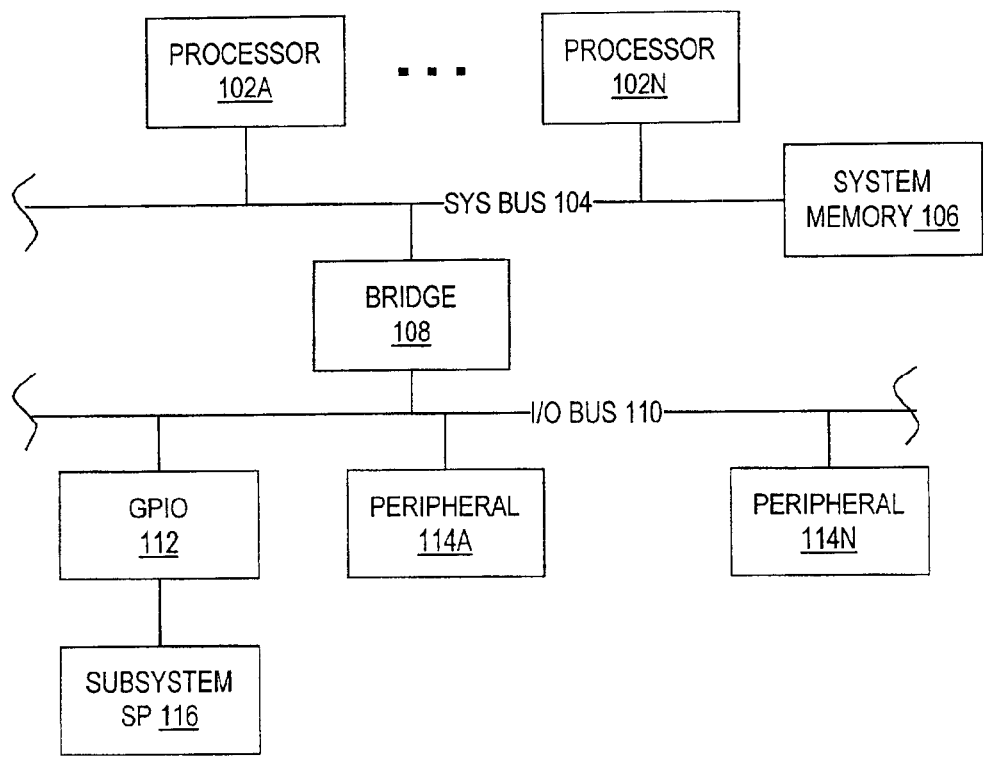
FIG. 1 is a block diagram of selected elements of a data processing system suitable for use with one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking the invention contemplates a data processing system implementing redundant service processors and a corresponding method for handling fail-over control in the system. The system typically includes two management modules and at least one managed subsystem such as a server blade. Each management module includes a service processor and control logic configured to receive various status signals from the service processor and to generate a control signal based thereon. The fail-over mechanism must be able to handle various fail-over scenarios. A first fail-over scenario occurs when one of the service processors is not installed and the remaining service processor must assume control after initialization. Another scenario occurs when one of the service processors becomes non-responsive (i.e., "hangs"), either while initializing itself, while acting as a standby for the other service processor, or while acting as the active service processor in control of the system. A third scenario occurs when one of the service processors detects an internal failure and either "surrenders" control to the other service processor or takes itself out of consideration for becoming the active service processor in the future. A fourth fail-over scenario occurs when the standby service processor detects a failure of the active service processor and usurps control of all subsystems from the active service processor. The implemented system is preferably capable of handling each of these scenarios.

Before describing specific features of the management modules that include the redundant service processors and implement the fail-over mechanism according to the present invention, selected elements of a data processing system typical of the subsystems managed by the management modules are described. Turning to the drawings, FIG. 1 illustrates selected features of a data processing system 100 representing one embodiment of a subsystem managed by the redundant service processor feature of the present invention. Data processing system 100 may be implemented entirely upon a single printed circuit board or "blade." Thus, data processing system 100 may be referred to herein as server blade 100. In the depicted embodiment, server blade 100 includes a set of main processors 102A through 102N (generically or collectively referred to as processor(s) 102) that are connected to a system bus 104. A common system memory 106 is accessible to each processor 102 via system bus 104. The system memory is typically implemented with a volatile storage medium such as an array of dynamic random access memory (DRAM) devices. The depicted architecture of server blade 100 is frequently referred to as a symmetric multiprocessor (SMP) system because each processor 102 has substantially equal access to system memory 106.

In server blade 100, a bus bridge 108 provides an interface between system bus 104 and an I/O bus 110 to which one or more peripheral devices 114A through 114N (generically or collectively referred to as peripheral device(s) 114) as well as a general purpose I/O (GPIO) port are connected. Peripheral devices 114 may include devices such as a graphics adapter, a high-speed network adapter or network interface card (NIC), a hard-disk controller, and the like. I/O bus 110 is typically compliant with one of several industry standard I/O bus specifications including, as a common example, the Peripheral Components Interface (PCI) bus as specified in *PCI Local Bus Specification Rev* 2.2 by the PCI Special Interest Group (www.pcisig.com).

The depicted embodiment of server blade 100 includes a subsystem service processor 116 connected to GPIO port 112. Subsystem service processor 116 is configured to provide support for main processors 102. This support may include, for example, monitoring the power supplied to main processor(s) 102 and, in the event of a blade crash, initiating a restart of the main processors. Although each server blade 100 may include a subsystem service processor 116, the present invention is primarily associated with redundant service processors on a management blade associated with a collection or network of service blades as described in greater detail below.

Figure 2A:
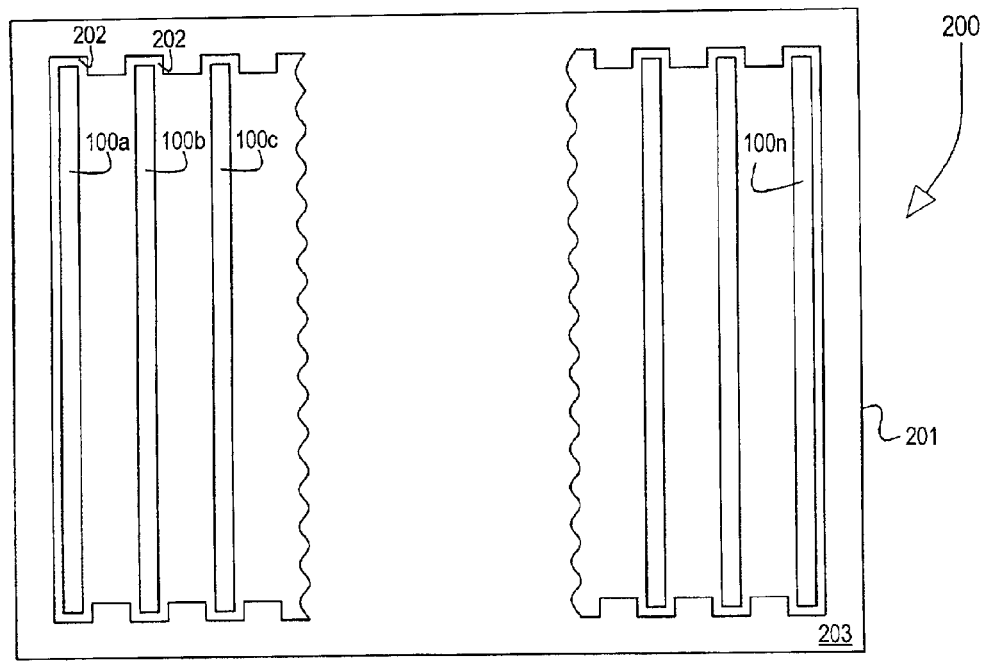
FIG. 2A is a front view of a data processing configuration according to one embodiment of the invention.
Figure 2B:
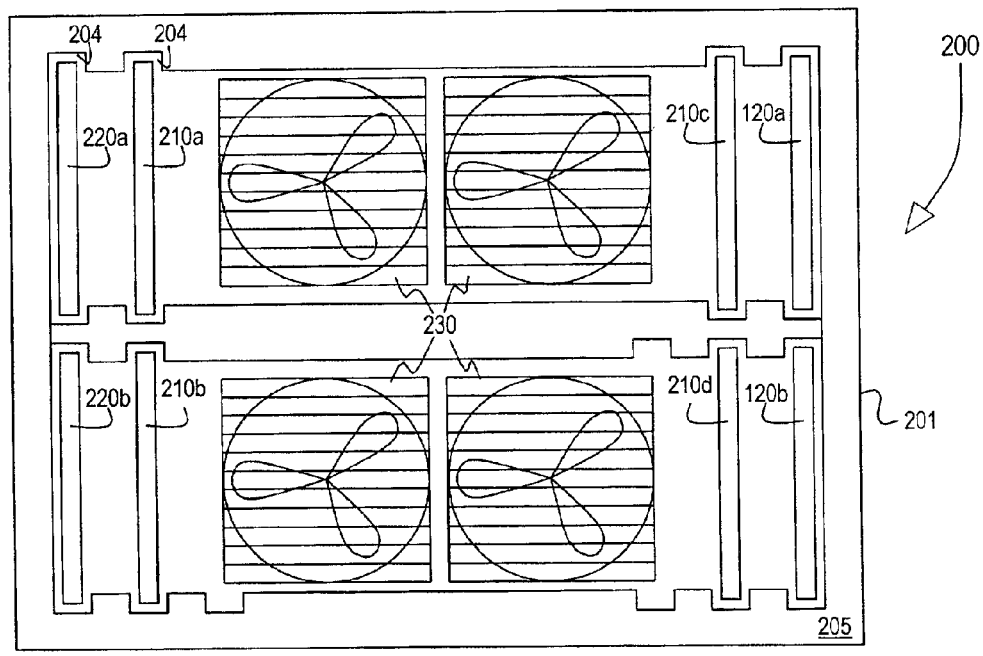
FIG. 2B is a rear view of the data processing configuration depicted in FIG. 2A.

Turning now to FIGS. 2A and 2B, front and rear views respectively of an embodiment of a data processing configuration 200 are illustrated. The depicted embodiment of data processing configuration 200 includes a plurality of server blades 100 and further includes a redundant service processor architecture according to the present invention. In this implementation, server blades 100 represent subsystems of configuration 200 that are managed by the active service processor.

As shown in the front view of FIG. 2A, data processing configuration 200 includes a cabinet (or chassis) 201 having a plurality of slots 202 in its front face 203. Each rack 202 is configured to receive a printed circuit board-based subsystem such as a server blade 100. (The set of server blades depicted in FIG. 2 are identified by reference numerals 100a through 100n). Each server blade 100 is plugged into an interconnection (not depicted) referred to herein as the mid-plane because of its intermediate location between server blades 100 and other adapters or blades that are plugged into the opposite side of the mid-plane from the rear face of cabinet 201 (see FIG. 2B). In this embodiment, the interconnected server blades 100 in configuration 200 are suitable for implementing a local area network (LAN) such as an Ethernet LAN in which each blade 100 has its own IP address and Media Access Control (MAC) address. Configuration 200 may itself be connected to an external network such as the Internet through a gateway (not depicted) or other suitable network device.

The number of server blades within cabinet 201 varies with the implementation. In a representative configuration, the front face 203 of cabinet 201 includes 14 or more slots 202 for receiving server blades 100. Each server blade 100 is typically a full-height adapter.

The rear view of data processing configuration 200 depicted in FIG. 2B illustrates additional selected elements of the configuration. More specifically, the rear face 205 of cabinet 201 includes a set of half-height slots 204. Various half-height modules or blades are plugged into the previously mentioned mid-plane via slots 204 in rear face 205. In the depicted embodiment, these modules include a set of network interconnect modules identified by reference numerals 210a, 210b, 210c, and 210d, a pair of power supply modules 220a and 220b, and first and second system management modules 120a and 120b (generically or collectively referred to as management module(s) 120). Also shown are a set of cabinet cooling fans 230. It will be appreciated that the number of network interface modules 210, power supply modules 220, and cabinet cooling fans 230 is implementation specific. Network interface modules 210 provide connectivity between the server blades 100 and an external network such as the Internet. In one embodiment, each server blade 100 is configured with four independent network connection paths via the four separate modules 210a through 210d. The power supply modules 220a and 220b provide configuration 200 with the required voltage levels.

Generally speaking, each management module 120 is configured to monitor and control resources and characteristics of subsystems in data processing configuration 200 that are shared by each server blade 100. These resources and characteristics may include, for example, the power applied to cabinet 201, cabinet cooling fans, and environmental characteristics such as the ambient temperature within cabinet 201.

Portions of the present invention may be implemented as a sequence of processor executable instructions (software) for monitoring the insertion and removal of server blades in a data processing network where the instructions are stored on a computer readable medium. During execution, portions of the software may reside in a volatile storage element such as the memory 141 (FIG. 3 as described below) associated with service processors 130 or an external or internal cache memory (not depicted) of processor(s) 130. At other times, portions of the software may be stored on a non-volatile storage medium such as a floppy diskette, hard disk, CD ROM, DVD, magnetic tape, or other suitable storage medium. In addition, portions of the software may be executed by management module 120 while other portions are executed by subsystem service processors 116 of each server blade 100.

Figure 3:
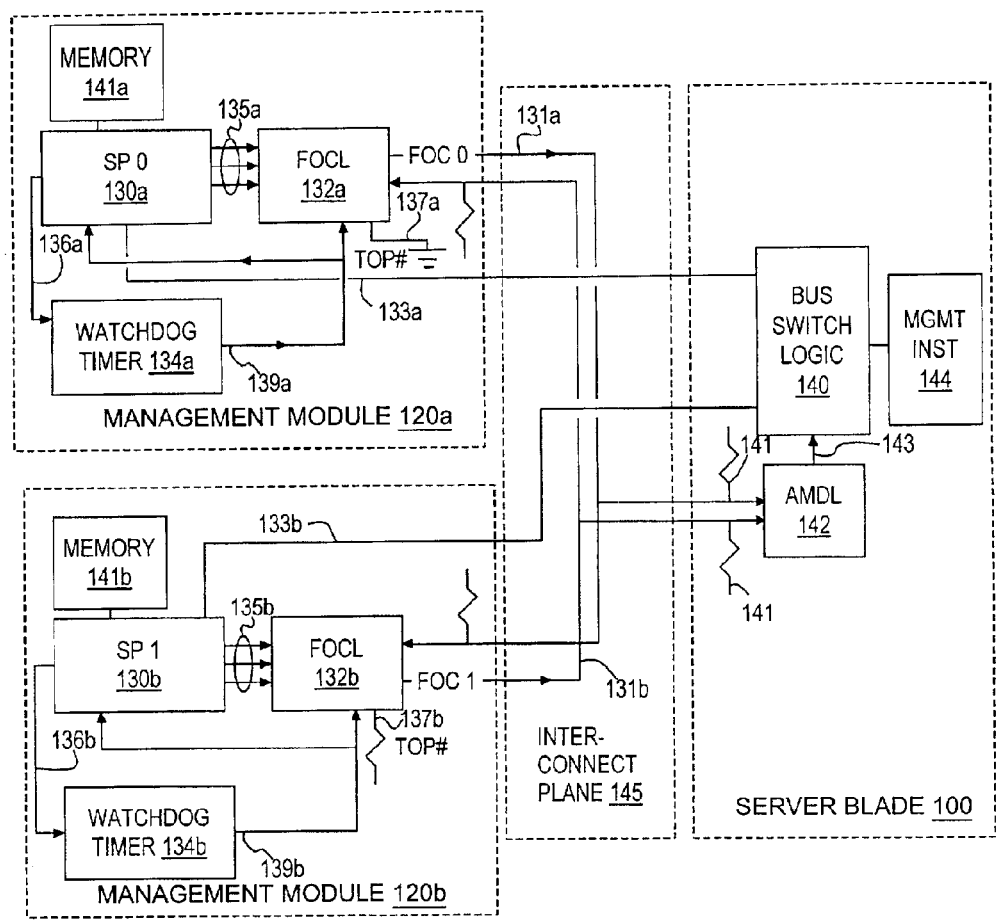
FIG. 3 is a block diagram illustrating selected elements of a data processing network and system emphasizing the redundant service processors and corresponding control logic.

Turning now to FIG. 3, selected elements of configuration 200 emphasizing the redundant service processor architecture according to one embodiment of the invention are depicted. FIG. 3 depicts selected elements of a first management module 120a, a second management module 120b, a single server blade 100, and an intervening interconnection plane (mid-plane) 145 of configuration 200. First and second management modules 120a and 120b (generically or collectively referred to as management module(s) 120) are typically implemented as physically distinct modules that may be removed or installed independent of all other modules and circuit boards. Each management module 120 includes a corresponding service processor 130. Thus, management module 120a includes service processor (SP 0) 130a and management module 120b includes service processor (SP 1) 130b. Generally speaking, one of these service processors is typically acting as the active manager of configuration 200 while the other is acting as a standby manager. Each management module 120 includes substantially similar logic and, accordingly, details of only the first management module 120a are included herein.

In the depicted embodiment, management module 120a includes fail-over control logic (FOCL) 132a and a watchdog timer 134a. FOCL 132a is typically configured to allow its corresponding service processor 130a to control a fail-over control signal (FOC 0) 131a. Fail-over control signal 131a, in conjunction with a corresponding signal identified as fail-over control signal (FOC 1) 131b generated by service module 130b, are used to initiate and indicate a change in the identity of the active service processor. The two FOC signals 131 can indicate one of four possible combinations. In one embodiment, the identity of the active service processor is determined based upon the parity of the FOC signals 131.

Service modules 120 manage subsystems of configuration 200. In FIG. 3, one such subsystem is represented by a server blade 100. Each managed subsystem, including each server blade 100, must be able to determine which of multiple management modules 120 (and service processors 130) is currently active. To facilitate this determination, each managed subsystem includes active manager determination logic (AMDL) 142. AMDL 142 is configured to receive the FOC signals 131 from each management module 120. AMDL is further configured to determine the active module from the state of the received signals 131. In an embodiment where control is determined based upon the parity of FOC signals 131, AMDL 142 may be implemented as an exclusive OR (XOR) circuit. In the depicted embodiment, the managed subsystem represented by server blade 100 includes pull up resistors 141 connected between each FOC signal 131 and VCC to prevent indeterminate logic levels if either FOC signal 131 is floating, such as if either management module 120 is removed.

AMDL logic 142 generates a switch control signal 143 that is asserted whenever there is a change in the identity of the active service processor. Switch control signals 143 provides an input to bus switch logic 140. In addition, switch control signal 143 may be provided to a processor on the managed subsystem to enable the subsystem to determine the identity of the active processor. In the case where the managed subsystem is a server blade 100, switch control signal 143 may be provided either to the blade's general purpose (main) processor 102 or to its subsystem service processor 116 depending upon the implementation.

In the depicted embodiment, each service processor 130 generates management logic signals that are provided to managed subsystems such as server blade 100 to control or monitor various aspects of each managed subsystem. Typically, these management logic signals, represented by reference numerals 133a and 133b (generically or collectively referred to as management logic signal(s) 133), comply with an industry standard signal bus protocol or specification. Management logic signals 133 may comply, for example, with the RS-232, RS-485, or I²C specifications. Management logic signals 133 from each service processor 130 are provided to bus switch logic 140 on server blade 100. Bus switch logic 140 is configured as a switching network that connects the managed subsystem to the management control signals of the active processor based upon the state of switch control signal 143. Thus, bus switch logic 140 acts as a bus-width multiplexer that provides the management control signals from the active service processor to managed instrumentation, represented by reference numeral 144, within the managed subsystem. Management instrumentation 144 represents devices or logic within the managed subsystem that are configured to respond to the active service processor. Managed instrumentation 144 generally identifies that portion of the managed subsystem that provides visibility to the status and health of the subsystem and provides control access to the subsystem.

As further depicted in FIG. 3, service processor 130a is configured to generate various status signals, identified by reference numeral 135a, and to provide status signals 135a to FOCL 132a. Status signals 135 allow each service processor 130 to describe its assessment of its own health and the health of its peer service processor. FOCL 132 is configured to alter the state of its corresponding FOC signal 131 depending upon the status of service processor 130. If, for example, the status of a service processor 130 that is currently the active processor transitions from a functional status to a non-functional status, FOCL 132 is configured to initiate a fail-over event by toggling FOC signal 131 to change the active processor.

Each management module 120 as depicted in FIG. 3 further includes a position signal (indicated by reference numerals 137*a* and 137*b*). As their names imply, position signals 137 indicate the physical position of the corresponding management module 130. In the embodiment depicted in FIGS. 2 and 3, there are two slots available for management modules 120. To indicate the physical position, position signal 137*a* of management module 120*a* is connected to ground (i.e., tied low) while position signal 137*b* of management module 120*b* is connected to VCC (i.e., tied high). FOCL 132 of each management module 120 receives position signal 137 and, in conjunction with FOC signals 131, determines which service processor 130 is the active manager.

Management modules 120 may further include a watchdog timer identified by reference numeral 134. Watchdog timers are well known and commonly used in the industry to detect a non-responsive processor and reset it. Watchdog timer 134 receives a watchdog signal 136 from service processor 130. Watchdog signal 136 informs watchdog timer 134 that the service processor is alive. In one embodiment, service processor 130 will assert watchdog timer signal 136 periodically at some programmable or predeterminable interval under normal operating conditions. If watchdog signal 136 is not asserted within the specified predetermined interval, watchdog timer 134 will assert a reset signal 139 that is provided to appropriate reset inputs of service processor 130 and FOCL 132.

In the embodiment depicted in FIG. 3, each management module 120 plugs into interconnection plane 145, which is typically implemented as a mid-plane printed circuit board. One or more server blades 100 are also connected to interconnection plane 145. In this embodiment, server blades 100 represent the subsystems managed by management modules 120.

From a functional perspective, the depicted embodiment of the present invention operates as follows. (The following description is from the perspective of management module 120*a* such that "local" refers to logic or signals on module 120*a* while "remote" refers to logic or signals on module 120*b*). FOCL 132 on each management module 120 produces an FOC signal 131 that is routed through interconnection plane 145 to each server blade 100 and to the other management module. AMDL 142 on each server blade combines the two FOC signals 131 into a switch control signal 143. AMDL 142 may be implemented as an XOR gate. Weak pull-up resistors on each server blade 100 connected to FOC signals 131 assure that the signals assume a known and stable state even if one or both management modules 120 are not installed.

FOCL 132 functions by evaluating status signals 135 produced by service processor 130 and generating FOC signal 131 based thereon. FOC signal 131 can be used to initiate a fail-over of service processors under appropriate conditions. In a typical embodiment, status signals 135 include a local OK (LOK#) signal 152 (see FIG. 4 discussed below) indicating the state of the corresponding (local) service processor. Signals 135 will typically further include a remote OK (ROK#) signal 153 indicating the status of the remote service processor. The status of the remote service processor is determined by establishing and maintaining communications between service processors 130*a* and 130*b* via a communications channel that is not shown explicitly in FIG. 3. Typically, this inter-processor communication channel users an Ethernet, RS 485, and/or RS-232 port associated with each service processor.

In addition, status signals 135 may include a ready signal 151. The state of ready signal 151 indicates that the corresponding service processor 130 has completed all local and remote assessments and is ready to participate in the active service processor determination process. If ready signal 151 is not asserted, FOC signal 131 assumes a high-impedance state as if its management module 120 were not installed. After a hardware reset, ready signal 151 is initialized to the state that disables FOC signal 131 (i.e., the reset signal must set FOC signal 131 to a high-Z state after reset).

If the watchdog timer 134 is included, the status signals 135 may further include a watchdog timer reset signal 139 that indicates, when asserted, that watchdog timer 134 was allowed to expire and that, therefore, the local service processor 130 appears non-responsive and unable to perform duties as the active service processor. After hardware reset, the state of this signal is not critical because the ready line will prevent any values of this signal from affecting the determination of the active manager. It is assumed that watchdog timer 134 allows enough time after reset for its service processor 130 to initialize and begin to manage the watchdog timer before the timer resets the service processor again.

In addition to these status signals, FOCL 132 typically receives a clock signal (CLK) and a power good reset signal (RST#). The clock signal determines the appropriate times for FOC signal 131 to transition. It is not necessary that the clock signal for management module 120*a* be synchronized to the clock signal of management module 120*b*. The power good reset signal typically initializes all logic to a known state when power is applied to management module 120.

In one embodiment, FOCL 132 combines the signals indicated in the preceding to produce FOC signal 131 in compliance with the following guidelines. FOC 131 must assume a high-impedance state if the local service processor 130 is not ready to participate in the active manager determination process. FOC signal 131 maintains its current state (whether high or low) if either of two conditions are TRUE. The first condition is determined by the combination of the local FOC signal 131*a* and the remote FOC signal 131*b*, and the (local) position signal 137*a*. If these signals indicate that service processor 130*a* is in control, that service processor 130*a* is functioning, and that service processor 130*a* does not have a watchdog timer reset pending, the state of local control signal 131*a* is maintained. Similarly, if these signals indicate that the remote service processor 130*b* is the active service processor and that the local service processor 130*a* has determined that the active service processor (remote service processor 130*b*) is healthy, no state change of FOC signal 131*a* is made. Thus, FOC signal 131 will not transition if the active service processor 130 is determined to be fully functioning whether the active processor is local or remote.

On the other hand, local FOC signal 131*a* will transition (change state) when either of two conditions is present. The first condition (for transitioning FOC signal 131) is met when the combination of local FOC signal 131*a*, remote FOC signal 131*b*, and local position signal 137*a*, indicate that the local service processor 130*a* is the active service processor and that the service processor is either non-functional or has a watchdog time reset pending. The second condition for toggling FOC signal 131*a* is met if the status signals indicate that remote service processor 130*b* is the active service processor and that local service processor 130*a* has determined that the remote service proper is non-functional.

Figure 4:
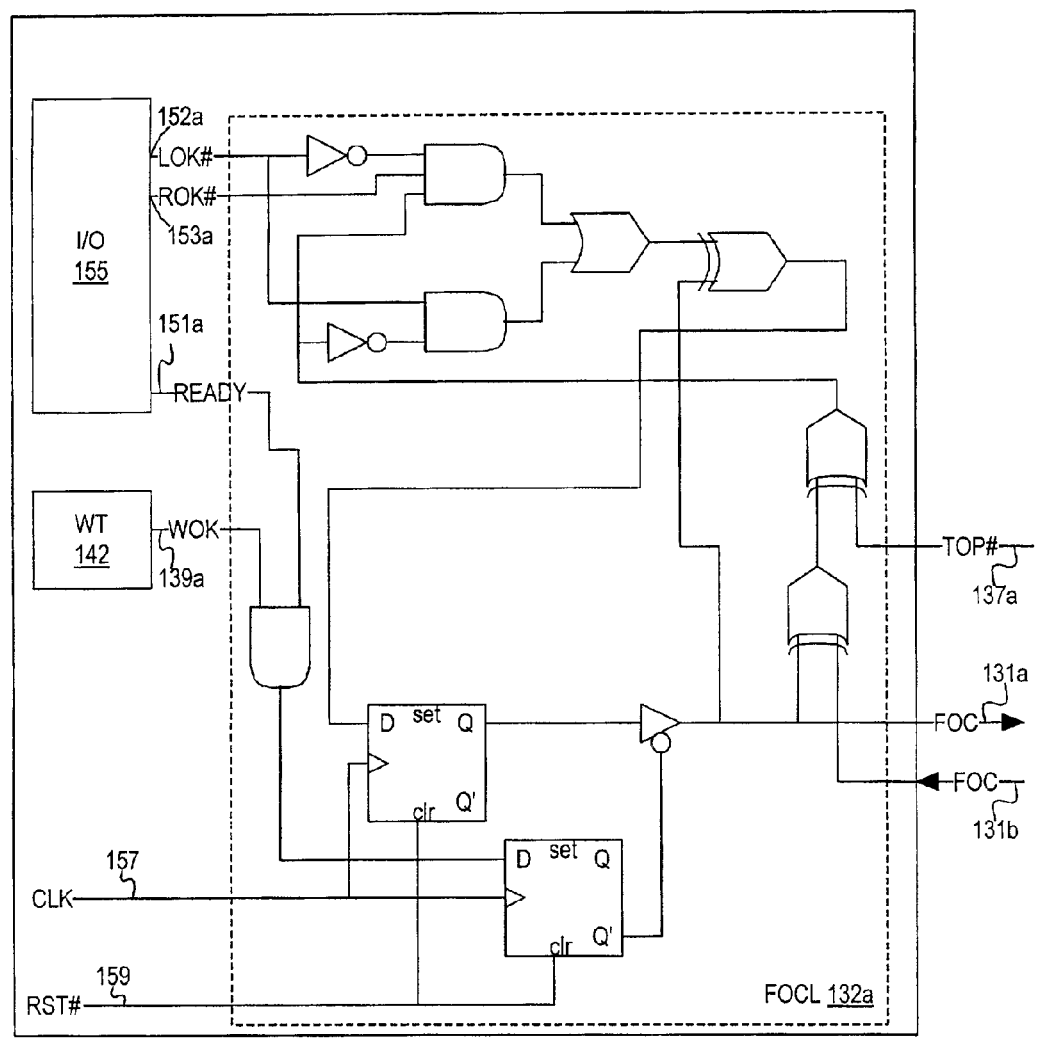
FIG. 4 is a logic diagram illustrating additional detail of an embodiment of a management module of FIG. 3.

Referring now to FIG. 4, a logic diagram of selected elements of FOCL 132 according to one embodiment of the present invention is depicted. In the depicted embodiment, FOCL 132 receives, via I/O unit 155 of service processor 130 status signals including READY signal 151, LOK# signal 152, and ROK# signal 153 (where the # symbol indicates an inverted signal). In addition to these inputs, FOCL 132a receives a clock signal (CLK) 157, a power good reset signal (RST#) 159, a position signal 137a, and the FOC signal 131b from the remote management module 120b. The logic of FOCL 132a is configured to maintain the state of FOC signal 131a as described in the preceding functional description. Generally, FOCL 132 is configured to maintain FOC signal 131a in its current state if the active service processor is healthy and is further configured to transition or toggle FOC signal 131b if the active service processor is not healthy.

Figure 5:
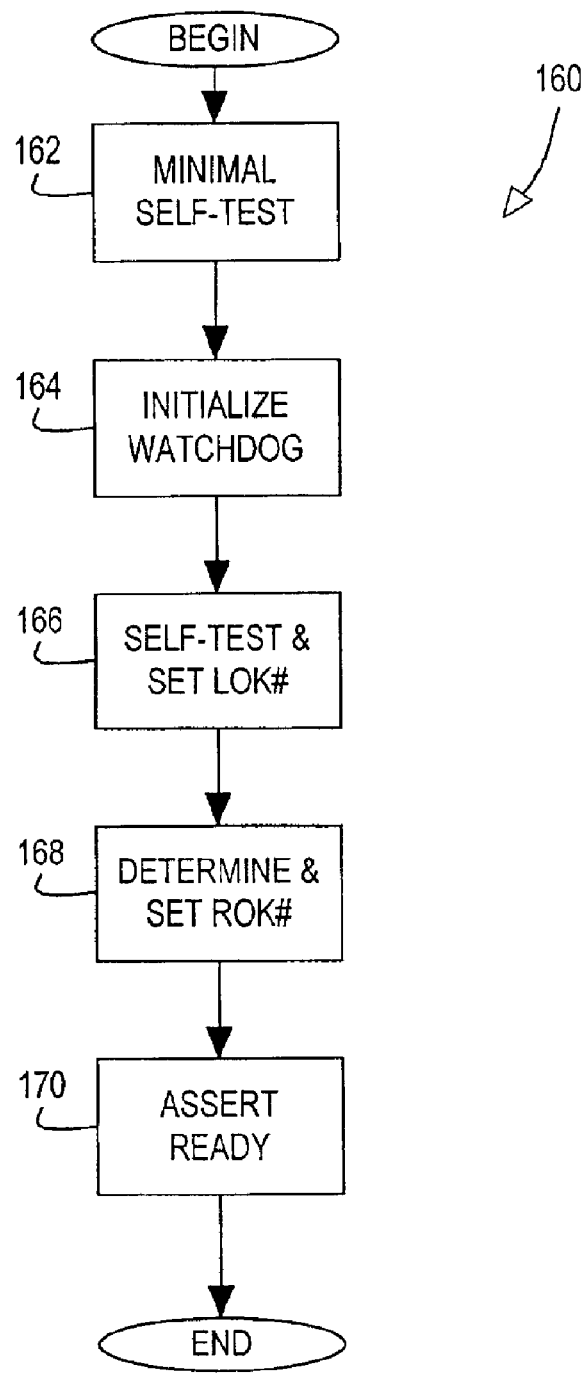
FIG. 5 is a flow diagram illustrating a method of initializing the redundant service processors of the present invention.

In addition to the hardware illustrated in the figures and described in the preceding paragraphs, management modules 120 typically include software that facilitates the determination of the active service processor. More specifically, the management module software is preferably configured to implement the following methods of initializing and managing FOCL 132. Referring to FIG. 5, a flow diagram illustrating a method 160 of initializing FOCL 132 according to one embodiment of the present invention is depicted. In the depicted embodiment, initialization method 160 includes performing (block 162) a minimal self-test of the local service processor 130. The minimal self-test typically is just sufficient to verify gross functionality of service processor 130. Assuming the minimal self-test passes, the watchdog timer 134 (if present) is initialized (block 164) so that it does not reset the local service processor 130. This action is typically achieved by periodically writing a non-zero value to an I/O port or memory location that prevents the watchdog timer from "timing out." Initialization method 160 as depicted includes a more involved and time consuming self-test (block 166) that checks local service processor 130 and other units on management module 120 to determine the overall health of management module 120. After this self test completes, LOK# signal 152a, which indicates the health of the local service processor to FOCL 132, is set by writing to an appropriate I/O or memory location. Method 160 according to the depicted embodiment then attempts to determine (block 168) the health of remote service processor 130b and setting the ROK# signal 153a appropriately. The state of the remote processor's health is typically determined by checking status signals to first see if the remote processor is installed and then establishing a communication link (RS-232, RS-485, Ethernet, or the like) to determine the state of the remote processor. After determining the state of the remote processor, ROK# signal 153a is set by writing to the appropriate I/O or memory location. Upon successfully initializing the watchdog timer and determining the health of the local and remote service processors, the READY signal is asserted (block 170) by writing to an appropriate I/O or memory location to allow the service processor to participate in the active manager determination process.

Figure 6:
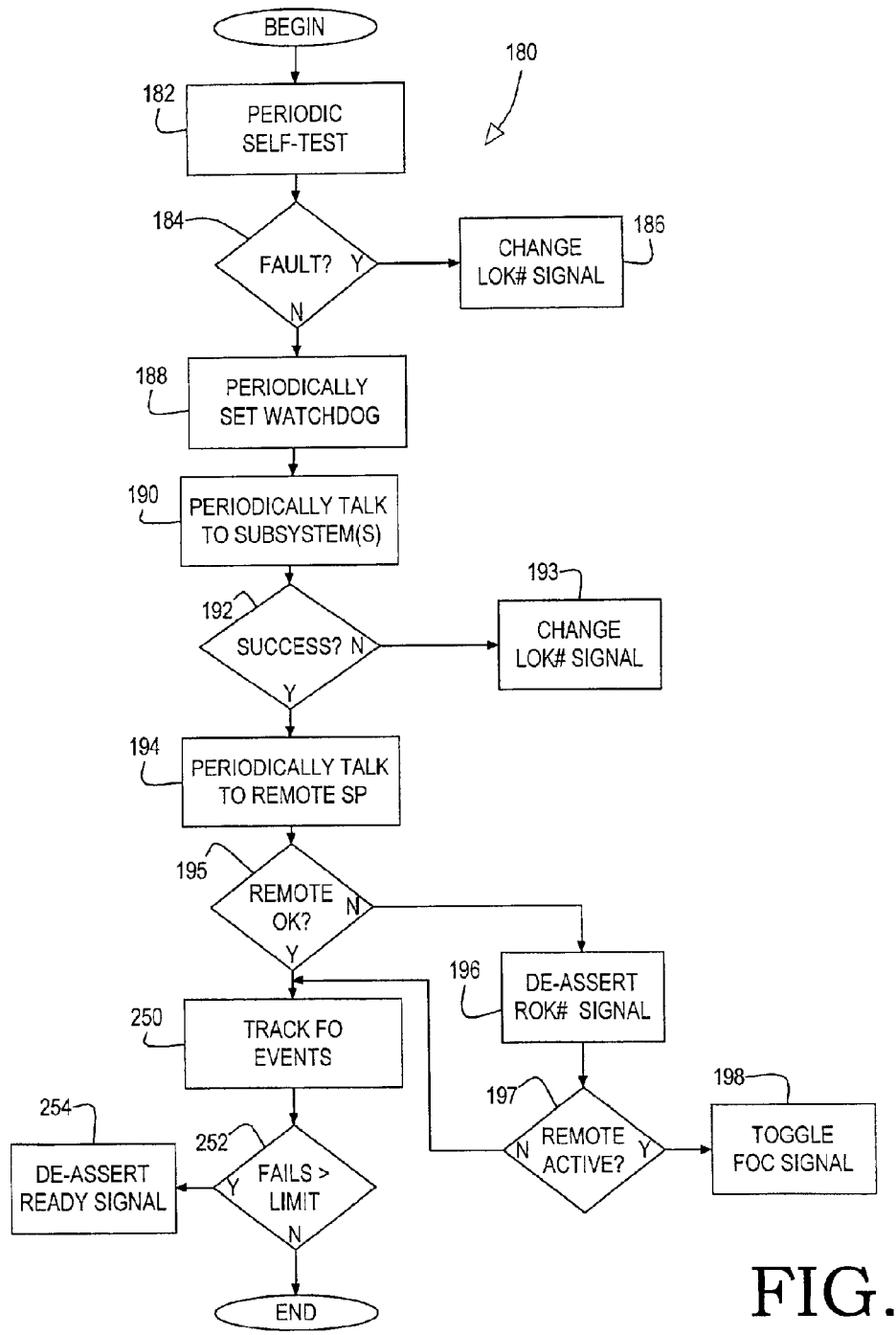
FIG. 6 is a flow diagram illustrating a method of ongoing maintenance in a redundant service processor system according to one embodiment of the present invention.

Referring now to FIG. 6, a flow diagram illustrating a method 180 of on-going service processor management according to one embodiment of the invention is depicted. In the depicted embodiment, local service processor 130a periodically performs (block 182) a self-test. If any actual or predicted fault is identified (block 184), the state of the local service processor health (LOK#) signal is transitioned (block 186) to the state indicating that the local service processor is not fully functioning. This transition will typically result in a transition of FOC signal 131a if the local service processor was the active service processor (i.e., if the remote management module was active, control does not change when the local service processor finds a fault with itself). Assuming that remote FOC signal 131b remains static, this will cause the state of switch control signal 143 to change. The remote FOCL 132b also detects the state change and determines that is now the active service processor. Note, however, that the FOC signal 131b generated by remote FOCL 132b does not change in response to this event because to do so would result in a fail-over of control back to the defective local processor 130a. In addition to performing periodic self checks, local service processor 130a must periodically set (block 188) watchdog timer 134a by writing to an appropriate I/O or memory location to prevent the watchdog timer from resetting local processor 130a and passing control to remote service processor 130b. Local service processor 130a also periodically attempts to establish communication (block 190) with a managed subsystem such as server blade 100. If local service processor 130a determines (block 192) that it is unable to communicate with any of the managed subsystems 100, it must change (block 193) the state of its LOK# signal 152a to indicate that it is not functional. This change of state will typically result in a fail-over of control to remote service processor 130b.

Local service processor 130a will also attempt periodically to determine (block 194) the state of remote service processor 130b. If inter-processor communications are possible via multiple channels, the preferred embodiment attempts to communicate over two or more of the available channels. Whenever an inter-processor communication link is established where none previously existed or all previously established links are lost, local service processor 130a must change the state of the ROK# signal to reflect the new status. If (block 195) the new status of remote service processor is not healthy, the ROK# signal is de-asserted (block 196). The de-assertion of ROK# will sometimes cause FOCL 132a to transition FOC signal 131a if is appropriate to do so. More specifically, if FOCL 132a senses the ROK# signal 153a change to a healthy status, no action is taken because it is not necessary to switch control when the remote processor comes on-line. If ROK# signal 131a transitions to an unhealthy state, FOCL 132a will act depending upon the identity of the currently active service processor. If FOCL 132a determines (block 197) the remote service to be the active processor based on the state of FOC 131a, FOC 131b, and TOP# 137a, FOCL 132a will toggle (block 198) its FOC signal 131a to force control to pass to the local service processor.

Local service processor 130a is also configured to track (block 250) fail-over events that occur within a specified time period. If the number of fail-over events that occur during the specified interval exceed a predetermined maximum (block 252), the service processor is configured to declare itself ineligible to participate in the service processor determination process. A service processor declares itself ineligible by de-asserting (block 254) its READY signal 151. This mechanism prevents a situation in which each service processor detects that the other is non-functional and attempts to gain control by initiating a fail-over. When the fail-over is complete, the non-active processor will determine that the new active processor is non-functional and repeat the process indefinitely. By placing a limit on the number of fail-over events that can occur in a specified interval, the invention prevents an endless loop scenario in which neither service processor is in control. Generally speaking, fail-overs are monitored by interrupting the service processor each time a fail-over occurs, counting the number of interrupts, and de-asserting the READY signal if the number of fail-over events exceeds the specified threshold.

Following a hardware reset, the selection of which service processor 130 will act as the initial active processor is non-deterministic. Because management modules 120 are configured as substantially identical and redundant elements, however, the outcome of the initial service processor determination following reset is irrelevant. Initially, the switch control signals 143 of each managed subsystem will favor one of the service processors because the FOC signals 131 will be floating and the pull-up resistors will bias the switch signal to favor one of the service processors. After a service processor 130 fails, the amount of time that passes before a fail-over occurs is dependent upon the duration of the watchdog timer interval, the speed of the clock to the fail-over control logic, and the frequency with which the other service processor checks for communications between the management modules. Careful selection of these parameters can achieve a fail-over response time of a few seconds down to less than a second.

Both management modules 120*a* and 120*b* are capable of presenting themselves on local area configuration 200 and must, therefore, have a network address such as an IP address, MAC address, or other suitable and unique identifier. If an application program such as a management and deployment application exemplified by the IBM Director program is attempting to communicate with the active management module at the time the management module fails, the preferred embodiment of the invention migrates the IP address from the hung service processor to the new active service processor as part of the fail-over sequence. This process is facilitated by configuring each management module 120 to know which module is in control at any time. During initialization, the active management module 120 may pass its identifying address to the remote management module. When a fail-over occurs, the active module stops responding to the IP address and the standby module must program its network stack to begin responding to requests set to that address. Network traffic in transit when a fail-over occurs will either be responded to by the new active management module or will time out. In the case of a time-out, a subsequent retry will likely be successful.

It will be apparent to those skilled in the art having the benefit of this disclosure that the present invention contemplates a system and method for controlling the active service processor in a system featuring redundant service processors. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A data processing configuration, comprising:
   a first management module including a first processor and first processor control logic configured to receive status information from the first processor and to generate a control signal based thereon;
   a second management module including a second processor and second processor control logic configured to receive status information from the first processor and to generate a control signal based thereon; and
   a managed subsystem configured to receive the first and second control signals and including determination logic that identifies which of the first and second management modules is the active management module based, at least in part, on the state of the control signals;
   wherein the determination logic on the managed subsystem determines the active management module based upon the parity of the received control signals.

2. The system of claim 1, further comprising switching logic configured to provide management module signals from either the first or second management modules to managed instrumentation of the subsystem based on the identification of the determination logic.

3. The system of claim 1, wherein the status information includes a signal indicating the functionality of the first processor, a signal indicating the status of the second processor, and a ready signal that, when asserted, enables the corresponding management module to participate in the active manager determination process.

4. The system of claim 3, wherein the management module control logic is configured to maintain the control signal in a high impedance state if the ready signal is not asserted.

5. The system of claim 4, wherein the management module control logic is configured to maintain the state of the control signal if the status information indicates that the active management module processor is functional and further configured to change the state of the control signal if status information indicates that the active management module processor is non-functional.

6. The system of claim 1, wherein each management module further includes a watchdog timer configured to reset the corresponding processor if a predetermined interval has expired without the processor taking action to prevent the reset.

7. The system of claim 1, wherein the determination logic comprises an XOR of the received control signals.

8. The system of claim 1, wherein the active management module is configured to periodically determine the functionality of its processor and, upon detecting a change in the state of its processor, to initiate a change of the active management module.

9. The system of claim 8, wherein the change of state is initiated by changing the state of the control signal.

10. The system of claim 1, wherein the active management module is configured to periodically determine the functionality of the processor of the other management module.

11. The system of claim 1, wherein the active management module is configured to monitor the number of state changes in its corresponding control signal and to de-assert the ready signal if the number of state changes exceeds a predetermined threshold.

12. The system of claim 1, wherein the status information further includes a position signal indicating a physical rack position of the corresponding management module.

13. The system of claim 1, wherein the control signals are biased to a predetermined logical level when in a high impedance state.

14. A management module suitable for use in conjunction with a data processing configuration having a plurality of interconnected data processing systems, comprising:
   a processor configured to generate management logic signals suitable for controlling predetermined aspects of the interconnected data processing systems and further configured to generate status information indicative of the functionality of the processor and the functionality of a peer processor comprising an element of a second management module of the configuration;

processor control logic configured to receive the status information from the processor and to generate a control signal based thereon wherein the control signal indicates, in conjunction with a second control signal generated by the second management module, of which management module is currently active;

wherein the processor control logic is configured to maintain the state of the control signal if the processor of the currently active management module is functional and further configured to toggle the control signal if the processor of the currently active management module is non-functional;

wherein the status information further includes a position signal indicating a physical rack position of the corresponding management module.

15. The management module of claim 14, wherein the status information further includes a ready signal that, when asserted, enables the management module to participate in determining the active management module.

16. The management module of claim 15, wherein the management module control logic is configured to maintain the control signal in a high impedance state if the ready signal is not asserted.

17. The management module of claim 14, further comprising a watchdog timer configured to reset the processor if a predetermined interval has expired without the processor taking action to prevent the reset.

18. The management module of claim 14, wherein the active management module is configured to periodically determine the functionality of its processor and, upon detecting a change in the state of its processor, to initiate a change of the active management module.

19. The management module of claim 18, wherein the change of state is initiated by toggling the control signal.

20. The management module of claim 14, wherein the active management module is configured to periodically determine the functionality of the peer processor.

21. The management module of claim 14, wherein the active management module is configured to monitor the number of state changes in its corresponding control signal and to de-assert the ready signal if the number of state changes exceeds a predetermined threshold.

22. The management module of claim 14, wherein the control signal is biased to a predetermined logical level when in a high impedance state.

23. A management module suitable for use in conjunction with a data processing configuration having a plurality of interconnected data processing systems, comprising:

a processor configured to generate management logic signals suitable for controlling predetermined aspects of the interconnected data processing systems and further configured to generate status information indicative of the functionality of the processor and the functionality of a peer processor comprising an element of a second management module of the configuration; and processor control logic configured to receive the status information from the processor and to generate a control signal based thereon wherein the control signal indicates, in conjunction with a second control signal generated by the second management module, of which management module is currently active;

wherein the processor control logic is configured to maintain the state of the control signal if the processor of the currently active management module is functional and further configured to toggle the control signal if the processor of the currently active management module is non-functional; and wherein the active management module is configured to monitor the number of state changes in its corresponding control signal and to de-assert the ready signal if the number of state changes exceeds a predetermined threshold.

* * * * *